G. R. EATON.
FRICTION TRANSMISSION GEARING.
APPLICATION FILED MAY 4, 1910.

986,811.

Patented Mar. 14, 1911.
2 SHEETS—SHEET 1.

Witnesses

Inventor
Gordon R. Eaton

G. R. EATON.
FRICTION TRANSMISSION GEARING.
APPLICATION FILED MAY 4, 1910.

986,811.

Patented Mar. 14, 1911.

2 SHEETS—SHEET 2.

Witnesses

Inventor
Gordon R. Eaton

UNITED STATES PATENT OFFICE.

GORDON RUPERT EATON, OF BUFFALO, NEW YORK.

FRICTION TRANSMISSION-GEARING.

986,811.   Specification of Letters Patent.   Patented Mar. 14, 1911.

Application filed May 4, 1910. Serial No. 559,362.

*To all whom it may concern:*

Be it known that I, GORDON RUPERT EATON, a subject of the King of Great Britain, and resident of the city of Buffalo, in the State of New York, one of the United States of America, have invented certain new and useful Improvements in Friction Transmission-Gearing; and I do hereby declare that the following is a full, clear, and exact description of the same.

The invention relates to improvements in friction transmission gearing, as described in the following specification and illustrated in the accompanying drawings that form part of the same.

The invention consists essentially in the novel construction and arrangement of parts, whereby movement is transmitted from the main shaft to the driven shaft by rotary members flexibly supported and adjustably held in frictional contact with a member rotated by said main shaft and a member slidably secured to said driven shaft, and whereby a direct connection is effected between the said shafts at high speed.

The objects of the invention are, to obviate undue strains and unequal wear of the parts, to equalize the forces holding the friction surfaces in working contact, and to devise a mechanism of simple, strong and durable construction wherein perfect flexibility is attained.

Figure 1:
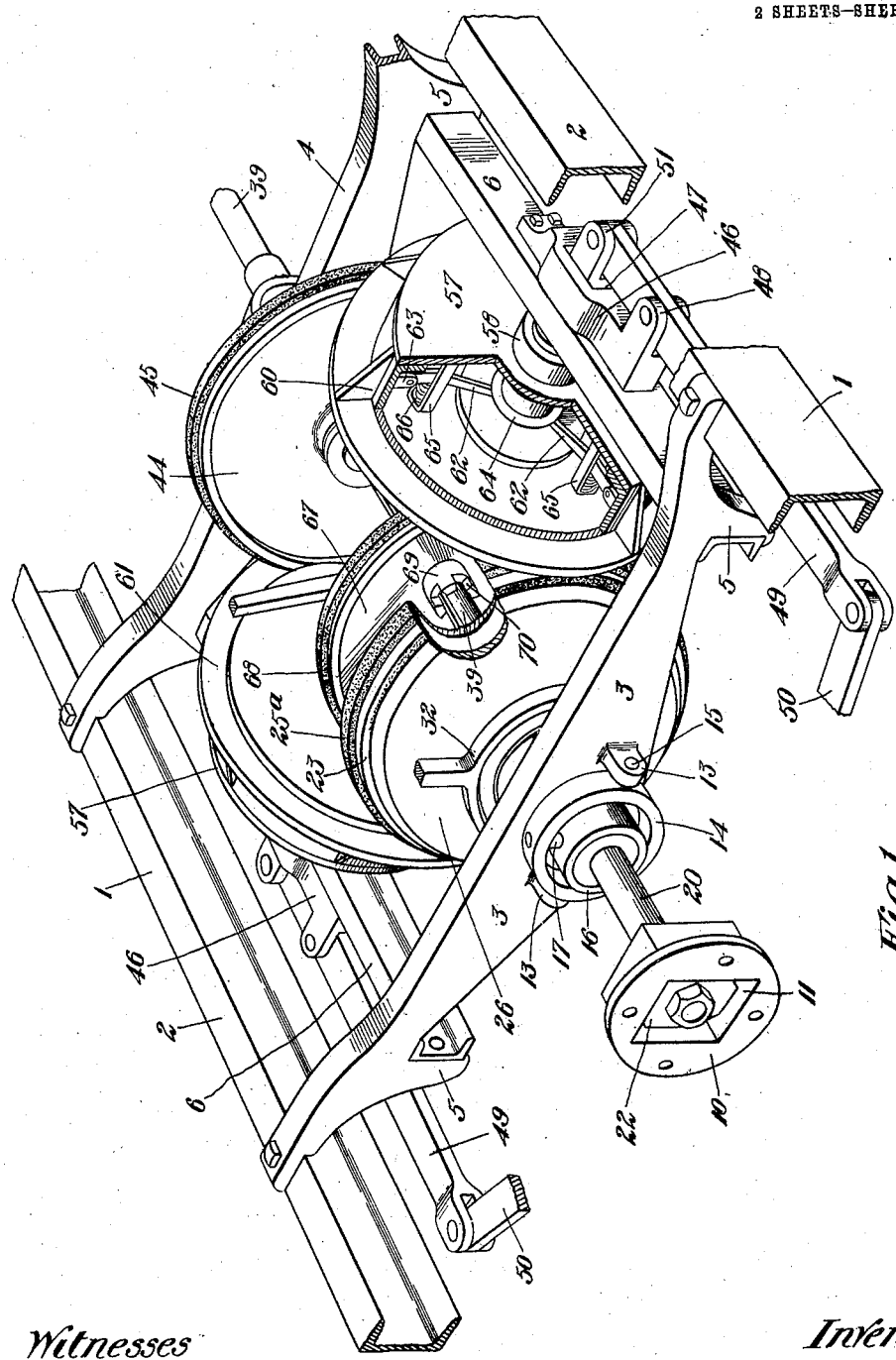
Figure 2:
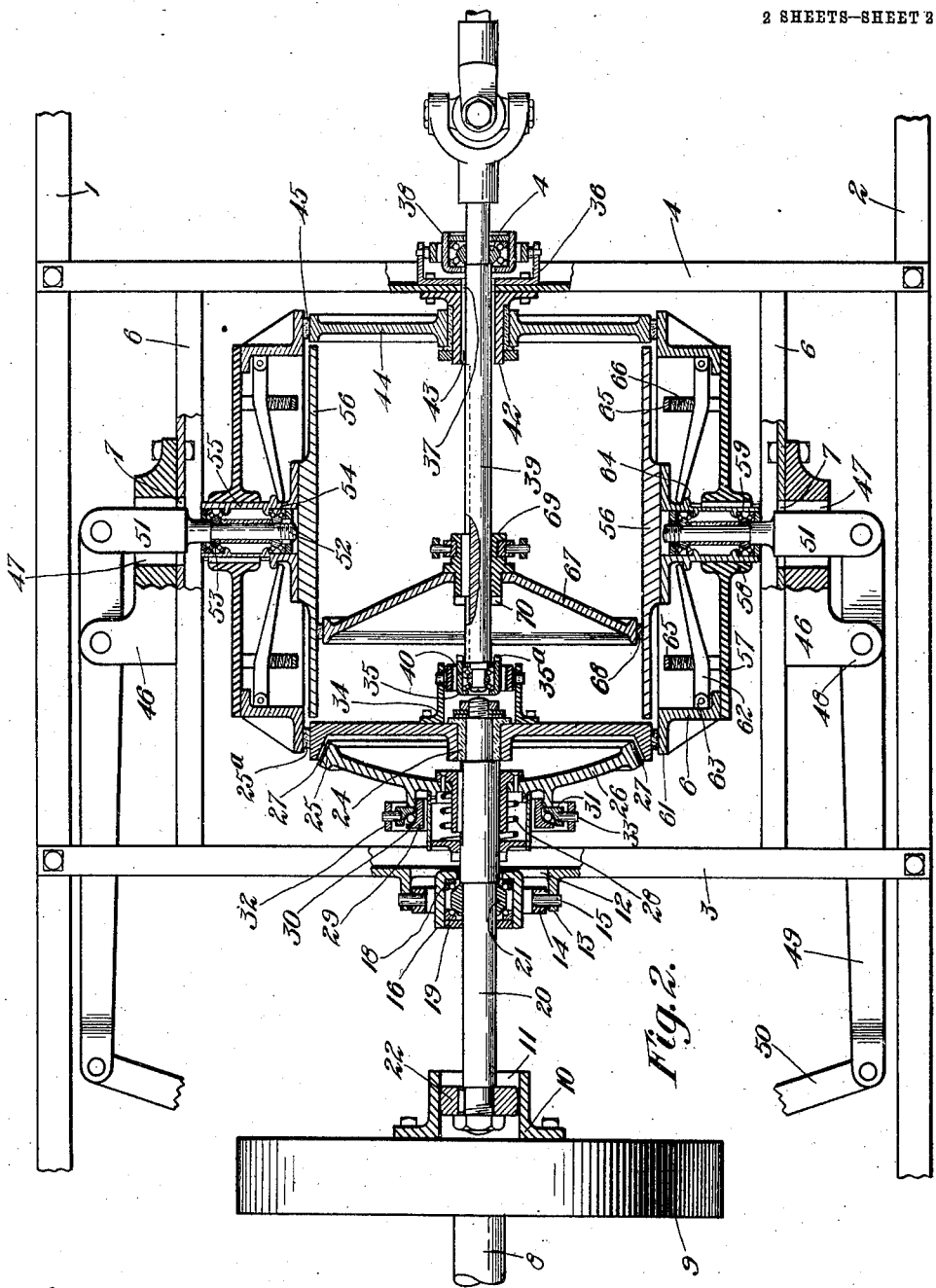

In the drawings, Figure 1 is a perspective view of the device shown partly broken away. Fig. 2 is a horizontal sectional view of the device.

Like numerals of reference indicate corresponding parts in each figure.

Referring to the drawings, 1 and 2 are the side bars of the frame upon which the device is supported.

3 and 4 are cross bars extending between and rigidly secured to the side bars 1 and 2 and spaced apart, each having downwardly depending lugs 5 at each side thereof.

6 are spacing bars rigidly secured to the lugs 5 and extending between the bars 3 and 4, each of said bars having a rectangular oblong shaped slot 7 through the web.

8 is the main shaft, preferably forming part of the crank shaft of the motor.

9 is a fly wheel secured to the shaft 8.

10 is a socket flange rigidly secured to the fly wheel 9 and having the squared recess 11 therein.

12 is an opening centrally arranged in the web of the cross-bar 3 and 13 are lugs projecting outwardly from said bar at each side of said opening.

14 is a ring having the rigid pins 15 arranged diametrically opposite one to the other and projecting outwardly therefrom and journaled in orifices in the lugs 13.

16 is a cylindrical sleeve fitting loosely in the ring 14 and having the rigid pins 17 projecting outwardly therefrom and journaled in orifices in said ring, said pins 17 being arranged in right angular relation to the pins 15.

18 is a stationary ball cup secured within the sleeve 16.

19 is a ball cup adjustably secured within the casing 16.

20 is a shaft extending through the sleeve 16 and having a cone 21 secured thereto, said cone being supported by ball bearings from the cups 18 and 19.

22 is a squared block rigidly secured to one end of the shaft 20 and fitting within the recess in the socket flange 10. The shaft 20 is thus flexibly supported and rotatively connected to the main shaft.

23 is a disk journaled upon a bearing 24 on the opposite end of the shaft 20 and held from longitudinal movement and having a beveled friction surface 25.

25ª is a friction band secured to the periphery of the disk 23.

26 is the main clutch disk slidably and non-rotatively supported on the shaft 20 and having a beveled friction surface 27 adapted to engage the friction surface 25 of the disk 23. The disk 26 is held by the spring 28 in constant working engagement with the disk 23.

29 is a ring secured to the disk 26 and having a ball race 30 formed at its outer end.

31 is a ring encircling the ring 29 and supported therefrom by suitable ball bearings.

32 is a fork lever secured by the pins 33 to the ring 31 and adapted to be operated to hold the main clutch disk out of contact with the disk 23.

34 are a pair of brackets rigidly secured to the outer side of the disk 23.

35 is a ball bearing sleeve similar to the sleeve 16 universally supported from the brackets 34 in a similar manner to the sleeve 16, said sleeve having clutch teeth 35ª projecting from its outer end.

36 are a pair of brackets rigidly secured to the cross bar 4 to each side of the central opening 37 through the web thereof.

38 is a ball bearing sleeve similar to the sleeves 16 and 35 and supported in a like manner from the brackets 36 and in alinement with the aforesaid sleeves.

39 is the driven shaft having the bearing cones 40 and 41 secured thereto and supported by suitable ball bearings from the sleeves 35 and 38 respectively. It will be seen from this description that the shafts 20 and 39 are both flexibly supported in alinement with the main shaft 8.

42 is a trunnion rigidly secured to the inner side of the cross bar 4 and having a central orifice 43 through which the shaft 39 extends, said orifice being considerably larger than said shaft.

44 is a disk journaled on the periphery of the trunnion 42 and rotating idly thereon. The disk 44 is the same diameter as the clutch disk 23 and is provided with a friction band 45 corresponding to the band 25ª on the disk 23.

46 are brackets rigidly secured to the outer sides of the spacing bars 6 and having rectangular oblong slots 47 therein registering with the slots 7 and jaw shaped lugs 48 at one end.

49 are levers pivotally secured to the lugs 48 and having jaw shaped outer ends.

50 are links pivotally secured to the outer ends of the levers 49 and adapted to be connected to suitable operating means for swinging said levers and holding them rigidly in various positions.

51 are members rectangular in cross section slidably arranged in the slots 47 in the brackets 46 and having jaw shaped outer ends pivotally secured to the levers 49 and spindle shaped inner ends 52.

53 and 54 are double ball bearing cones arranged at the inner and outer ends of the spindle ends of the members 51.

55 are sleeves encircling the spindles 52 and having stationary and adjustable ball cups arranged in pairs at the inner and outer ends thereof and holding ball bearings in engagement with the cones 53 and 54. The ball bearings thus arranged form substantial thrust bearings.

56 are disks rigidly secured to the flanged inner ends of the sleeves 55 and having smooth flat inner faces. The peripheral edges of the disks 56 extend close to the inner faces of the disks 23 and 44 and on the movement of the levers 49 are moved toward or from the shaft 39.

57 are disks having their hubs 58 encircling the sleeves 55 and slidable thereon and non-rotatively secured to said sleeves by the feather keys 59.

60 are annular rings rigidly secured to the inner faces of the disks 57 and having the lateral annular flanges 61 extending outwardly from their inner ends, said flanges being adapted to engage the friction bands secured to the peripheries of the disks 23 and 44 transmitting a rotary movement to the disks 56 on the rotation of the clutch disk 23.

62 are levers pivotally secured to the lugs 63 formed on the inner walls of the rings 60 and arranged in diametrically opposite pairs, four levers being preferably provided in each ring. The levers 62 project inwardly from the rings 60 and their inner ends are adapted to engage annular shoulders 64 extending outwardly from the sleeves 55.

65 are U-shaped stirrups rigidly secured at their ends to the inner faces of the disks 57 and extending inwardly and around the levers 62.

66 are compression springs secured in the stirrups 65 and engaging the inner edges of the levers 62. In the event of the sleeves 55 being moved inwardly the shoulders 64 draw the levers 62 inwardly, consequently drawing the rings 60 inwardly and holding said rings in close engagement with the disks 23 and 44. The springs 66 equalize the pressure between the disks 56 and rings 60.

67 is a disk slidably and non-rotatively secured to the shaft 39 and having a friction band 68 encircling its periphery, said band being adapted to engage the flat inner surfaces of the disks 56. The disk 67 thus transmits the rotary movement imparted from the disks 56 to the shaft 39. The disk 67 is operated back and forth on the shaft 39 and increases or diminishes the speed of the said shaft or changes its direction of rotation according to the position to which it is moved. The hub 69 of the sliding disk 67 is formed with clutch teeth 70 adapted to engage the teeth 35ª on the bearing sleeve 35 when the said disk 67 is moved to its extreme high speed position, thus directly connecting the shaft 39 with the shaft 20.

In the operation of this device, the main shaft 8 connected to the engine or other source of power, is rotated in its bearings. The shaft 20 is flexibly supported in the journal bearings described and rotatively connected to the main shaft through the socket 10 and squared block 22. The edges of said block being arc-shaped allow the shaft 20 to swing freely but maintains a perfect operating connection. The main clutch disk 26 rotates with the shaft 20 and engaging the disk 23 rotates the latter disk upon its bearing on the inner end of said shaft. The rotating disk 23 and idler disk 44 are of equal diameters and engage the annular flanges of the rings 60. The said rings 60 are held in operating contact with the peripheral frictional surface of the disks 23 and 44 by means of the levers 49 through the medium of the levers 62 and compression springs 66 engaging the annular flanges on the sleeves 55. The rings are thus spring held in engagement with the friction surfaces of the said disks, and automatically adjust themselves to the wear of the friction bands. The pressure on said rings may be increased or decreased by means of the mechanism for operating the levers 49.

In the event of the friction surface of either of the disks 23 or 44 wearing quicker than the other the rings 60 being pivotally supported from the ends of the levers 49 will automatically swing and adjust themselves to the altered position, the members 51 moving in the slots 4 in the brackets 46. The tilting of the ring 60 will not effect the contact between the disks 56 and the disk 67 as sufficient pressure may be applied to the levers 49 to hold the said disks 56 in constant engagement with the disks 67 and the spring connection between the said disks 56 and the ring 60 will automatically adjust the relative position of the said disks and rings.

It will be seen from this description that there will be no undue strain upon the bearings of the disks 56 as the rings are supported at two points diametrically opposite and the position of the disks 56 may be altered in relation to the said rings 60 without placing any undue strain upon any of the parts owing to the flexibility of the connection between the said disks and rings, consequently if the friction surfaces should wear unevenly the flexibly supported transmission disks will maintain perfect contact with the peripheries of the driving and driven disks. The disks 67 being rotated by contact with the disks 56 transmits the movement to the shaft 39 and, through the bearing sleeve 35 rotates with the clutch disk 23, no motion is conveyed to the shaft 39 therethrough as the said shaft 39 is supported in a ball bearing within said sleeve. On the movement of the disk 67 to the high speed position the clutch teeth on the hub of said disk are brought into engagement with the clutch teeth on the inner end of the sleeve 35 and direct connection is thus established between the shaft 20 and the shaft 39. All the bearings for the shafts 20 and 30 are flexibly supported in universal joints and consequently any spring of the frame of the machine will not place any lateral strains upon the said shafts.

A mechanism such as described overcomes many of the difficulties incident to the uneven wear of friction surfaces and obviates all undue strains upon the parts.

All of the parts are very simple in construction and easily removed or replaced.

What I claim as my invention is:—

1. In a friction transmission gearing, the combination with a suitable frame and driving and driven shafts suitably journaled in said frame, of a rotary friction member rotating with said driving shaft, a friction member adjustably and non-rotatively secured to the driven shaft, a spindle or shaft flexibly and adjustably supported from said frame, and a rotary friction member journaled on said flexibly supported shaft and adapted to engage the aforesaid friction members to transmit motion from the driving shaft to the driven shaft.

2. In a friction transmission gearing, the combination with a suitable frame and a driving and driven shaft suitably journaled in said frame, of a friction member rotating with said driving shaft, a rotary friction member idly journaled from said frame, a friction member non-rotatively and adjustably secured to said driven shaft arranged between the friction member on said driving shaft and said idler, and a rotary friction member flexibly and adjustably supported from said frame and adapted to engage the peripheral surfaces of said driving, driven and idler members.

3. In a friction transmission gearing, a frame having a pair of cross-bars extending between the sides, journal bearings supported from said cross-bars, a main shaft journaled in the bearing supported from one of said cross-bars and suitably driven, a rotary clutch member operatively connected to said main shaft, a shaft journaled in the bearing supported from the other of said cross-bars, a rotary member adjustably secured to the latter shaft, a spindle flexibly and adjustably supported from said frame, and a friction member rotatably supported on said spindle and adapted to engage the aforesaid rotary members to transmit motion to the latter shaft.

4. In a friction transmission gearing, a frame having a pair of cross-bars extending between the sides, journal bearings supported from said cross-bars, a main shaft journaled in the bearing supported from one of said cross-bars and suitably driven, a rotary clutch member operatively connected to said main shaft, a shaft journaled in the bearing supported from the other of said cross-bars, a rotary friction member adjustably secured to the latter shaft, a rotary member idly journaled from the latter crossbar, a spindle flexibly and adjustably supported from said frame, and a friction member rotatively supported on said spindle and adapted to engage the peripheral surfaces of said idler and other rotary members.

5. In a friction transmission gearing, a frame having a pair of cross bars extending between the sides, journal bearings supported from said cross bars, a shaft journaled in the bearing supported from one of said cross-bars and suitably driven, a rotary clutch member operatively connected to said shaft, a shaft journaled in the bearing supported from the other of said cross bars, a rotary member encircling the latter shaft and idly journaled and of substantially the same diameter as the aforesaid rotary member, a rotary friction member slidably and non-rotatively secured to the latter shaft and arranged between the aforesaid rotary members and having a peripheral friction surface, a rotary member flexibly supported from the side of said frame and adjustably held in contact with said slidable member, and a rotary friction member slidably supported from said flexibly supported member and adapted to engage the clutch member and said idler member.

6. In a friction transmission gearing, the combination with the frame of a shaft suitably journaled in said frame and suitably driven, of a friction disk supported from said shaft and adapted to rotate therewith, said disk having a peripheral friction surface, a disk idly journaled from said frame in central alinement with the aforesaid disk and having a peripheral friction surface, a secondary shaft suitably journaled from said frame in alinement with the aforesaid shaft, a disk slidably and non-rotatively supported on said secondary shaft between the aforesaid disks and having a peripheral friction surface, a spindle member adjustably supported from the side of said frame, a friction disk journaled on said spindle member and adapted to engage the peripheral surface of said slidable friction disk, a rotary member slidably and non-rotatively supported from the disk carried by said spindle and adapted to engage the peripheral friction surfaces of the disk rotating with the first mentioned shaft and said idler disk, and means for moving the latter rotary member inwardly or outwardly coincident with the movement of the friction disk supported from said spindle.

7. In a friction transmission gearing, the combination with the frame, of a shaft suitably journaled in said frame and suitably driven, a disk supported from said shaft and adapted to rotate therewith, said disk having a peripheral friction surface, a disk journaled from said frame in central alinement with the aforesaid disk and having a peripheral friction surface, a secondary shaft suitably journaled from said frame in alinement with the aforesaid shaft, a disk slidably and non-rotatively supported on said secondary shaft between the aforesaid disks and having a peripheral friction surface, a spindle member adjustably supported from the side of said frame, a friction disk having a sleeve encircling said spindle and suitably journaled therefrom, said sleeve having an annular flange projecting outwardly therefrom, a circular member slidably and non-rotatively supported from the sleeve of the friction disk carried by said spindle and having a cylindrical flange and a lateral flange extending outwardly from the extremity of said cylindrical flange, a plurality of lever arms pivotally secured to the inner wall of said circular member extending inwardly therefrom and adapted to engage the annular projection from the sleeve of said friction disk, a plurality of stirrups rigidly secured to the inner side of said circular member and extending around said arms, and compression springs inserted between said arms and the outer looped ends of said stirrups.

8. In a friction transmission gearing, the combination with the frame, of a shaft suitably journaled in said frame and suitably driven, a disk supported from said shaft and adapted to rotate therewith, said disk having a peripheral friction surface, a disk idly journaled from said frame in central alinement with the aforesaid disk and having a peripheral friction surface, a secondary shaft suitably journaled from said frame in alinement with the aforesaid shaft, a disk slidably and non-rotatively supported on said secondary shaft between the aforesaid disks and having a peripheral friction surface, a lever pivotally supported from said frame, a square member pivotally secured to the inner end of said lever and extending through a slot in said frame and having a spindle shaped inner end, ball bearing cones secured to said spindle, a sleeve encircling said spindle, ball cups secured within said spindle, ball bearings inserted between said cups and the cones on said spindle and rotatively supporting said sleeve, a friction disk rigidly secured to the inner end of said sleeve and adapted to engage the peripheral friction surface of the disk slidably supported on said secondary shaft, a member slidably and non-rotatively secured to said sleeve and adapted to engage the peripheral friction surface of said idler disk and the disk rotating with the first mentioned shaft, and adjustable means for connecting said circular friction member with the disk secured to said sleeve adapted to move said circular member inwardly with the disk secured to said sleeve on the swinging of said lever on its fulcrum.

9. In a friction transmission gearing, a frame, a shaft journaled in said frame, a rotary member supported from and operated on said shaft, a pair of brackets secured to and extending from one side of said rotary member, a sleeve supported from said brackets by a universal connection and having clutch teeth projecting from one end thereof, ball cups secured within said sleeve, a secondary shaft suitably journaled from said frame and having one end thereof extending into said sleeve, a cone secured to the end of said shaft within said sleeve, ball bearings arranged between said cone and said ball cups, a friction disk slidably and non-rotatively supported on said secondary shaft and having clutch teeth projecting from one end of the hub and adapted to engage the clutch teeth on said sleeve, and a rotary member flexibly and adjustably supported from said frame and adapted to engage the rotary members supported on said shafts.

10. In a friction transmission gearing, a frame having a pair of rigid cross bars extending between the sides and spaced apart, a bearing sleeve universally supported from one of said cross bars, a main shaft suitably supported from said frame and suitably driven, a shaft journaled from said bearing sleeve and flexibly connected at one end to said main shaft, a bearing sleeve universally supported on the opposite end of the latter shaft, a bearing sleeve universally supported from the other of said cross bars, a shaft having one end thereof journaled in the bearing sleeve supported at the end of the aforesaid shaft and journaled in the bearing sleeve supported from the second cross bar, a friction disk rotatively supported from the first mentioned shaft and rotating therewith, a friction disk slidably and non-rotatively supported from the latter shaft, and rotatable members flexibly supported and adjustably held in engagement with the peripheral surfaces of said friction disks.

11. In a friction transmission gearing, a rigid frame having a plurality of journal bearings supported in central alinement therefrom, a main shaft supported from said frame and suitably driven, a shaft flexibly connected to and driven by said main shaft and journaled in one of said frame bearings, a shaft flexibly and non-rotatively connected to the latter shaft and supported in another of said frame bearings, a clutch disk rotatably supported on the intermediate shaft and having a friction surface on its periphery, means for causing said disk to rotate with said intermediate shaft, a friction disk slidably and non-rotatively supported on the shaft extending from the intermediate shaft, an idler disk journaled on said frame, a pair of rotatable friction members adjustably and flexibly supported from the sides of said frame and adapted to engage the peripheral surface of said clutch disk, slidable disk and idler, and means for holding said rotatable members in operating contact with said disks.

Signed at Buffalo Erie Co. N. Y. this 20 day of April.

GORDON RUPERT EATON.

Witnesses:
T. F. METZGER,
JNO. J. GUSS.

---

Copies of this patent may be obtained for five cents each, by addressing the "Commissioner of Patents, Washington, D. C."